(12) United States Patent
Grubert et al.

(10) Patent No.: US 10,369,548 B2
(45) Date of Patent: Aug. 6, 2019

(54) CATALYZED SOOT FILTER

(71) Applicants: BASF SE, Ludwigshafen (DE); BASF Corporation, Florham Park, NJ (US)

(72) Inventors: Gerd Grubert, Hannover (DE); Alfred H. Punke, Walle (DE); Torsten Neubauer, Langenhagen (DE); Marcus Hilgendorff, Hannover Bemerode (DE); Chung-Zong Wan, Somerset, NJ (US); Yuejin Li, Edison, NJ (US); Matthew Caudle, Hamilton, NJ (US)

(73) Assignees: BASF SE, Ludwigshafen (DE); BASF Corporation, Florham Park, NJ (US)

( * ) Notice: Subject to any disclaimer, the term of this patent is extended or adjusted under 35 U.S.C. 154(b) by 0 days.

(21) Appl. No.: 15/124,146

(22) PCT Filed: Mar. 11, 2015

(86) PCT No.: PCT/IB2015/051772
§ 371 (c)(1),
(2) Date: Sep. 7, 2016

(87) PCT Pub. No.: WO2015/136461
PCT Pub. Date: Sep. 17, 2015

(65) Prior Publication Data
US 2017/0021338 A1    Jan. 26, 2017

Related U.S. Application Data

(60) Provisional application No. 61/951,575, filed on Mar. 12, 2014.

(51) Int. Cl.
*B01D 53/94* (2006.01)
*B01J 37/02* (2006.01)
(Continued)

(52) U.S. Cl.
CPC ............ *B01J 23/72* (2013.01); *B01D 53/944* (2013.01); *B01D 53/9459* (2013.01);
(Continued)

(58) Field of Classification Search
CPC .......... B01D 53/945; B01D 2255/1021; B01D 53/9422; B01D 2255/1023;
(Continued)

(56) References Cited

U.S. PATENT DOCUMENTS 4,727,052 A    2/1988    Wan et al.
4,939,113 A    7/1990    Tauster et al.
(Continued)

FOREIGN PATENT DOCUMENTS

EP    2275194 A1    1/2011
JP    2002-97191 A    4/2002
(Continued)

OTHER PUBLICATIONS

Extended European Search Report in EP 15761954.5 dated Sep. 22, 2017, 7 pages.
(Continued)

*Primary Examiner* — Amber R Orlando
*Assistant Examiner* — Syed T Iqbal
(74) *Attorney, Agent, or Firm* — Oblon, McClelland, Maier & Neustadt, L.L.P.

(57) ABSTRACT

A catalyzed soot filter, in particular for the treatment of Diesel engine exhaust, comprises a coating design which ensures soot particulates filtration, assists the oxidation of carbon monoxide (CO), and produces low $H_2S$ emissions during normal engine operations and regeneration events.

18 Claims, 5 Drawing Sheets

(51) Int. Cl.
| | | |
|---|---|---|
| *F01N 3/28* | (2006.01) | |
| *B01J 23/72* | (2006.01) | |
| *F01N 3/035* | (2006.01) | |
| *B01J 35/00* | (2006.01) | |
| *B01J 23/42* | (2006.01) | |
| *B01J 23/89* | (2006.01) | |
| *B01J 35/04* | (2006.01) | |
| *B01J 21/12* | (2006.01) | |
| *B01J 23/44* | (2006.01) | |
| *B01J 27/224* | (2006.01) | |
| *B01J 35/10* | (2006.01) | |
| *F01N 13/10* | (2010.01) | |
| *B01J 35/02* | (2006.01) | |
| *F01N 3/08* | (2006.01) | |
| *F01N 3/10* | (2006.01) | |
| *F01N 3/20* | (2006.01) | |

(52) U.S. Cl.
CPC .......... *B01D 53/9468* (2013.01); *B01J 21/12* (2013.01); *B01J 23/42* (2013.01); *B01J 23/44* (2013.01); *B01J 23/8926* (2013.01); *B01J 27/224* (2013.01); *B01J 35/0006* (2013.01); *B01J 35/04* (2013.01); *B01J 35/1009* (2013.01); *B01J 37/0244* (2013.01); *F01N 3/035* (2013.01); *F01N 13/10* (2013.01); B01D 53/9431 (2013.01); B01D 2255/1021 (2013.01); B01D 2255/1023 (2013.01); B01D 2255/2073 (2013.01); B01D 2255/20738 (2013.01); B01D 2255/20753 (2013.01); B01D 2255/20761 (2013.01); B01D 2255/9032 (2013.01); B01D 2255/9155 (2013.01); B01D 2255/9202 (2013.01); B01D 2255/9207 (2013.01); B01D 2257/304 (2013.01); B01D 2258/012 (2013.01); B01J 35/023 (2013.01); B01J 35/10 (2013.01); B01J 35/1076 (2013.01); B01J 37/0219 (2013.01); B01J 37/0234 (2013.01); B01J 37/0248 (2013.01); F01N 3/0814 (2013.01); F01N 3/0842 (2013.01); F01N 3/103 (2013.01); F01N 3/2066 (2013.01); F01N 2570/10 (2013.01); Y02A 50/2341 (2018.01)

(58) Field of Classification Search
CPC ........ B01D 2255/1025; B01D 53/9495; B01D 2255/2063; B01D 2255/2065; B01D 2255/91; B01D 53/8628; B01D 2255/2061; B01D 2255/2042; B01D 2255/2047; B01D 2255/9022; B01D 53/0454; B01D 2255/2022; B01D 2255/2027; B01D 2255/206; B01D 2255/908; B01D 53/9481; B01D 2255/202; B01D 2255/20738; B01D 2255/902; B01D 2255/9207; B01D 53/02; B01D 53/8637; B01D 53/865; B01D 2251/30; B01D 2251/40; B01D 2253/25; B01D 2253/342; B01D 2255/204; B01D 2255/2045; B01D 2255/2066; B01D 2255/2068; B01D 2255/20707; B01D 2255/20715; B01D 2255/2073; B01D 2255/20746; B01D 2255/20753; B01D 2255/20761; B01D 2255/30; B01D 2255/9025; B01D 2257/30; B01D 2257/404; B01D 2258/01; B01D 2259/40009; B01D 2259/4145; B01D 2259/4566; B01D 53/0415; B01D 53/8612; B01D 53/8696; B01D 53/94; B01D 53/9409; B01D 53/9472; B01D 53/9477; B01J 2523/31; Y02A 50/2324; Y02A 50/2344; Y02A 50/2348
See application file for complete search history.

(56) References Cited

U.S. PATENT DOCUMENTS

| | | | |
|---|---|---|---|
| 4,961,917 A | 10/1990 | Byrne | |
| 4,996,180 A * | 2/1991 | Diwell | B01D 53/945 423/213.2 |
| 5,516,497 A | 5/1996 | Speronello et al. | |
| 5,937,641 A * | 8/1999 | Graham | B01J 35/04 60/302 |
| 7,022,644 B2 | 4/2006 | Foong et al. | |
| 2003/0158037 A1 | 8/2003 | Foong et al. | |
| 2008/0141661 A1 | 6/2008 | Voss et al. | |
| 2011/0014099 A1* | 1/2011 | Dornhaus | B01D 53/944 423/213.5 |
| 2011/0123421 A1 | 5/2011 | Grubert | |
| 2012/0288427 A1* | 11/2012 | Grubert | B01D 53/944 423/213.2 |
| 2014/0044630 A1 | 2/2014 | Swallow et al. | |

FOREIGN PATENT DOCUMENTS

| | | |
|---|---|---|
| JP | 2012-93677 A | 5/2012 |
| RU | 2009 135 272 A | 3/2011 |

OTHER PUBLICATIONS

PCT International Preliminary Report on Patentability in PCT/IB2015/051772 dated Sep. 13, 2016, 7 pages.
PCT International Search Report in PCT/IB15/51772 dated Aug. 26, 2015, 3 pages.
Office Action dated Oct. 23, 2018 in Japanese Patent Application No. 2016-555976.
Combined Russian Office Action and Search Report dated Nov. 22, 2018 in Patent Application No. 2016139278 (with English language translation of categories of cited documents).

* cited by examiner

CATALYZED SOOT FILTER

CROSS-REFERENCE TO RELATED APPLICATIONS

This application is the National Stage entry of PCT/IB2015/051772, filed on Mar. 11, 2015, which claims priority to U.S. Application No. 61/951,575, filed on Mar. 12, 2014, which is incorporated herein by reference in their entireties.

TECHNICAL FIELD

The present disclosure relates to a catalyzed soot filter, in particular for the treatment of Diesel engine exhaust, with a coating design which ensures soot particulates filtration, assists the oxidation of carbon monoxide (CO), and produces low $H_2S$ emissions during normal engine operations and regeneration events.

BACKGROUND

Diesel engine exhaust is a heterogeneous mixture which contains not only gaseous emissions such as carbon monoxide ("CO"), unburned hydrocarbons ("HC") and nitrogen oxides ("NOx"), but also condensed phase materials, i.e. liquids and solids, which constitute the so-ca lied particulates or particulate matter. Emissions treatment systems for diesel engines must treat all of the components of the exhaust to meet the emission standards set by the various regulatory agencies throughout the world.

The total particulate matter emissions of diesel exhaust contain three main components. One component is the solid, dry carbonaceous fraction or soot fraction. This dry carbonaceous fraction contributes to the visible soot emissions commonly associated with diesel exhaust. A second component of the particulate matter is the soluble organic fraction ("SOF"). The SOF can exist in diesel exhaust either as a vapor or as an aerosol (fine droplets of liquid condensate) depending on the temperature of the diesel exhaust. It is generally present as condensed liquids at the standard particulate collection temperature of 52° C. in diluted exhaust, as prescribed by a standard measurement test, such as the U.S. Heavy Duty Transient Federal Test Procedure. These liquids arise from two sources: (1) lubricating oil swept from the cylinder walls of the engine each time the pistons go up and down; and (2) unburned or partially burned diesel fuel. The third component of the particulate matter is the so-called sulfate fraction, which is formed from small quantities of sulfur components present in the diesel fuel.

Catalyst compositions and substrates on which the compositions are disposed are typically provided in diesel engine exhaust systems to convert certain or all of these exhaust components to innocuous components. For instance, oxidation catalysts that contain platinum group metals, base metals and combinations thereof, facilitate the treatment of diesel engine exhaust by promoting the conversion of both unburned hydrocarbons (HC) and carbon monoxide (CO) gaseous pollutants, and some proportion of the particulate matter through oxidation of these pollutants to carbon dioxide and water. Such catalysts have generally been disposed on various substrates (e.g. honeycomb flow through monolith substrates), which are placed in the exhaust of diesel engines to treat the exhaust before it vents to the atmosphere. Certain oxidation catalysts also promote the oxidation of NO to $NO_2$.

In addition to the use of oxidation catalysts, diesel particulate filters are used to achieve high particulate matter reduction in diesel emissions treatment systems. Known filter structures that remove particulate matter from diesel exhaust include honeycomb wall flow filters, wound or packed fiber filters, open cell foams, sintered metal filters, etc. However, ceramic wall flow filters, described below, receive the most attention. These filters are capable of removing over 99% of the particulate material from diesel exhaust. Typical ceramic wall flow filter substrates are composed of refractory materials such as cordierite or silicon-carbide. Wall flow substrates are particularly useful to filter particulate matter from diesel engine exhaust gases. A common construction is a multi-passage honeycomb structure having the ends of alternate passages on the inlet and outlet sides of the honeycomb structure plugged. This construction results in a checkerboard-type pattern on either end. Passages plugged on the inlet axial end are open on the outlet axial end. This permits the exhaust gas with the entrained particulate matter to enter the open inlet passages, flow through the porous internal walls and exit through the channels having open outlet axial ends. The particulate matter is thereby filtered on to the internal walls of the substrate. The gas pressure forces the exhaust gas through the porous structural walls into the channels closed at the upstream axial end and open at the downstream axial end. The accumulating particles will increase the back pressure from the filter on the engine. Thus, the accumulating particles have to be continuously or periodically burned out of the filter to maintain an acceptable back pressure.

Catalyst compositions deposited along the internal walls of the wall flow substrate assist in the regeneration of the filter substrates by promoting the combustion of the accumulated particulate matter. The combustion of the accumulated particulate matter restores acceptable back pressures within the exhaust system. These processes may be either passive or active regeneration processes. Both processes utilize an oxidant such as $O_2$ or $NO_2$ to combust the particulate matter.

Passive regeneration processes combust the particulate matter at temperatures within the normal operating range of the diesel exhaust system. Preferably, the oxidant used in the regeneration process is $NO_2$ since the soot fraction combusts at much lower temperatures than those needed when $O_2$ serves as the oxidant. While $O_2$ is readily available from the atmosphere, $NO_2$ can be actively generated through the use of upstream oxidation catalysts that oxidizes NO in the exhaust stream.

In spite of the presence of the catalyst compositions and provisions for using $NO_2$ as the oxidant, active regeneration processes are generally needed to clear out the accumulated particulate matter, and restore acceptable back pressures within the filter. The soot fraction of the particulate matter generally requires temperatures in excess of 500° C. to burn under oxygen rich (lean) conditions, which are higher temperatures than those typically present in diesel exhaust. Active regeneration processes are normally initiated by altering the engine management to raise temperatures in front of the filter up to 570-630° C.

With increasing standards, also the emission of NOx is regulated, and modern Diesel engines have to fulfill certain requirements regarding the overall emission of NOx. The emission of NOx may be reduced by a "lean NOx trap" (LNT) catalyst, unusually applied in combination with a catalyzed soot filter (CSF), and the LNT is usually applied upstream of the CSF. However, also LNT catalysts require sulfur regeneration from time to time, which may be achieved by a sequence of short, rich (stoichiometric ratio lower than 1) pulses. During this operation, the LNT releases unwanted hydrogen sulfide ($H_2S$), which has to be minimized. This function of an $H_2S$ reduction may also be applied to the CSF. But the CSF still has to perform other functions, such as a conversion of HC to CO, and the two functions influence each other. It is in particular known that a contact of the active components that are used as $H_2S$ suppression material and CO conversion material may reduce the efficiency of the catalytic function, especially of the CO conversion material.

It is an object of the present disclosure to provide a catalyzed soot filter (CSF) with a combined function of a $H_2S$ reduction and a CO reduction having a high $H_2S$ conversion rate and a reduced CO emission during normal engine operations and regeneration events, in particular active filter regeneration.

It is also an object of the present disclosure to provide a catalyzed soot filter (CSF) with a combined function of a $H_2S$ reduction and a CO and HC reduction having a high $H_2S$ conversion rate and a reduced CO and HC emission during normal engine operations and regeneration events, in particular active filter regeneration.

It is another object of the present disclosure to provide a catalyzed soot filter (CSF) with reduced back pressure.

It is still another object of the present disclosure to provide a catalyzed soot filter (CSF) with an increased CO conversion rate at a low $H_2S$ emission rate.

SUMMARY

Provided is a catalyzed soot filter, comprising a wall flow substrate comprising an inlet end, an outlet end, a substrate axial length extending between the inlet end and the outlet end, and a plurality of passages defined by internal walls of the wall flow filter substrate;

wherein the plurality of passages comprise inlet passages having an open inlet end and a closed outlet end, and outlet passages having a closed inlet end and an open outlet end;

wherein the internal walls of the inlet passages comprise an inlet coating comprising at least one layer, and the inlet coating extends from the inlet end to an inlet coating end, thereby defining an inlet coating length, wherein the inlet coating length is x % of the substrate axial length, with $25 \leq x \leq 100$; and wherein the internal walls of the outlet passages comprise an outlet coating comprising at least one layer, and the outlet coating extends from the outlet end to an outlet coating end, thereby defining an outlet coating length, wherein the outlet coating length is y % of the substrate axial length, with $25 \leq y \leq 100$;

wherein the inlet coating length defines an upstream zone of the catalyzed soot filter and the outlet coating length defines a downstream zone of the catalyzed soot filter;

wherein the catalyzed soot filter comprises at least one layer comprising at least one oxidation catalyst and at least one layer comprising at least one $H_2S$ suppressing material;

wherein the at least one oxidation catalyst and the at least one $H_2S$ suppressing material are separated by the internal walls of the wall flow filter substrate;

wherein the total coating length is x+y, and $x+y \geq 100$.

Further provided is a process for manufacturing such catalyzed soot filter, comprising the steps of (i) providing a wall flow substrate, preferably having a porosity in the range of from 38 to 75, determined according to mercury porosity measurement according to DIN 66133, wherein the wall flow substrate is preferably a cordierite substrate, aluminium titanate or a silicon carbide substrate, said wall flow substrate comprising an inlet end, and outlet end, a substrate axial length extending between the inlet end and the outlet end, and a plurality of passages defined by the internal walls of the wall flow substrate;

wherein the plurality of passages comprise inlet passages having an open inlet end and a closed outlet end, and outlet passages having a closed inlet end and an open outlet end;

wherein a given inlet passage, an adjacent outlet passage, and the internal wall between said inlet and said outlet passage define an overall passage;

(ii) applying a first coating to at least part of the internal walls of at least 25% of the overall passages such that the first coating extends from the inlet end to a first coating end whereby an inlet coating length is defined, wherein the inlet coating length is x % of the substrate axial length, with $25 \leq x \leq 100$, said first coating comprising at least one oxidation catalyst or at least one $H_2S$ suppressing material;

(iii) applying a second coating to at least part of the internal walls of at least 25% of the overall passages such that the second coating extends from the outlet end to a second coating end whereby an outlet coating length is defined, wherein the outlet coating length is y % of the substrate axial length, with $25 \leq y \leq 100$, said second coating comprising at least one oxidation catalyst or at least one $H_2S$ suppressing material;

wherein one of the inlet coating and the outlet coating comprises at least one oxidation catalyst, and the other of the inlet coating and the outlet coating comprises at least one $H_2S$ suppressing material, and said at least one oxidation catalyst and said at least one $H_2S$ suppressing material are separated by the internal walls of the wall flow filter substrate, and the total coating length is x+y, and $x+y \geq 100$.

Yet further provided is a system for treating a diesel engine exhaust stream, the system comprising an exhaust conduit in fluid communication with the diesel engine via an exhaust manifold;

a catalyzed soot filter as defined above;

and one or more of the following in fluid communication with the catalyzed soot filter: a diesel oxidation catalyst (DOC), a selective catalytic reduction (SCR) article, a NOx storage and reduction (NSR) catalytic article, a lean NOx trap (LNT), preferably wherein the catalyzed soot filter is arranged downstream of the LNT.

Still further provided is a method of treating a diesel engine exhaust stream, the exhaust stream containing soot particles, said method comprising contacting the exhaust stream with a catalyzed soot filter as defined above, preferably after having directed the exhaust stream through lean NOx trap (LNT).

The present disclosure also provides the use of a catalyzed soot filter as defined above in the treatment of an exhaust stream, preferably an diesel engine exhaust stream, the exhaust stream containing soot particles, and wherein the exhausts stream is contacted with the catalyzed soot filter, further preferably wherein the exhaust soot filter is arranged downstream of an article that produces $H_2S$.

Also provided is the use of CuO in the tenorite phase as an $H_2S$ suppressing material, preferably wherein the average crystallite size of the CuO is at least 30 nm, further preferably at least 40 nm, and more preferably at least 50 nm.

BRIEF DESCRIPTION OF DRAWINGS

FIG. 5 shows the maximum CO emission [in ppm] during active filter regeneration of the filters of Example 5.1 to 5.6.

DETAILED DESCRIPTION

The present disclosure relates to a catalyzed soot filter, comprising a wall flow substrate comprising an inlet end, an outlet end, a substrate axial length extending between the inlet end and the outlet end, and a plurality of passages defined by internal walls of the wall flow filter substrate;

wherein the plurality of passages comprise inlet passages having an open inlet end and a closed outlet end, and outlet passages having a closed inlet end and an open outlet end;

wherein the internal walls of the inlet passages comprise an inlet coating comprising at least one layer, and the inlet coating extends from the inlet end to an inlet coating end, thereby defining an inlet coating length, wherein the inlet coating length is x % of the substrate axial length, with $25 \leq x \leq 100$; and wherein the internal walls of the outlet passages comprise an outlet coating comprising at least one layer, and the outlet coating extends from the outlet end to an outlet coating end, thereby defining an outlet coating length, wherein the outlet coating length is y % of the substrate axial length, with $25 \leq y \leq 100$;

wherein the inlet coating length defines an upstream zone of the catalyzed soot filter and the outlet coating length defines a downstream zone of the catalyzed soot filter;

wherein the catalyzed soot filter comprises at least one layer comprising at least one oxidation catalyst and at least one layer comprising at least one $H_2S$ suppressing material;

wherein the at least one oxidation catalyst and the at least one $H_2S$ suppressing material are separated by the internal walls of the wall flow filter substrate;

wherein the total coating length is x+y, and $x+y \geq 100$.

According to the present disclosure, the catalyzed soot filter has an inlet coating length x, wherein the inlet coating length is x % of the substrate axial length, with $25 \leq x \leq 100$, and an outlet coating length y, wherein the outlet coating length is y % of the substrate axial length, with $25 \leq y \leq 100$, and a total coating length x+y with $x+y \geq 100$. Generally, there are no specific restrictions regarding the inlet coating length, the outlet coating length and the total coating length of the inventive catalyzed soot filter, provided they are in the ranges defined above.

Therefore, the present disclosure relates to the catalyzed soot filter as defined above wherein the inlet coating length x is in the range of from 25 to 100. Preferred values of x are, for example, in the range of from 50 to 100 ($50 \leq x \leq 100$), or from 60 to 100 ($60 < x \leq 100$), or from 75 to 100 ($75 < x \leq 100$), or from 90 to 100 ($90 < x \leq 100$), or from 95 to 100 ($95 < x \leq 100$).

The present disclosure also relates to the catalyzed soot filter as defined above wherein the outlet coating length y is in the range of from 25 to 100. Preferred values of y are, for example, in the range of from 50 to 100 ($50 \leq y \leq 100$), or from 60 to 100 ($60 < y \leq 100$), or from 75 to 100 ($75 < y \leq 100$), or from 90 to 100 ($90 < y \leq 100$), or from 95 to 100 ($95 < y \leq 100$).

The present disclosure also relates to the catalyzed soot filter as defined above wherein the total coating length x+y is more than 100 ($x+y>100$), or x+y is 150 or more ($x+y \geq 150$), or x+y is 175 or more ($x+y \geq 175$), or x+y is 200 ($x+y=200$), corresponding to a complete coating of the inlet and outlet sides.

Surprisingly it was found that an overlap of the coatings, such as an oxidation catalyst and an $H_2S$ suppressing material, is not disadvantageous, but rather advantageous if the two materials are separated by the internal walls of the wall flow substrate. This may be achieved by applying the two coatings form the two different sides of the wall flow filter substrate, i.e., one from the inlet side and the other one from the outlet side, such as, for example, the $H_2S$ suppressing material from the inlet side and the oxidation catalyst from the outlet side.

According to the present disclosure, the catalyzed soot filter comprises at least one layer comprising at least one oxidation catalyst and at least one layer comprising at least one $H_2S$ suppressing material. The at least one oxidation catalyst and the at least one $H_2S$ suppressing material are separated by the internal walls of the wall flow substrate. In other words, the oxidation catalyst and the $H_2S$ suppressing material are coated onto the filter from the two open ends of the filter, i.e., the open inlet end and the open outlet end. Thus, the oxidation catalyst and the $H_2S$ suppressing material are coated separately on the filter, one from the inlet side or inlet end, and one from the outlet side or outlet end, such as, for example, the $H_2S$ suppressing material from the inlet side and the oxidation catalyst from the outlet side. By way of such coating, the oxidation catalyst and the $H_2S$ suppressing material are separated by the internal walls of the wall flow filter substrate.

The oxidation catalyst and the $H_2S$ suppressing material may be coated onto or into the internal walls of the wall flow filter substrate. The coating onto the internal walls of the wall flow filter substrate may be achieved by using a corresponding support with a particle size allowing for the particles not to infiltrate pores of the internal walls. On the other hand, if the support material is small enough, or if the $H_2S$ suppressing material and/or the oxidation catalyst are not supported at all, it may infiltrate into the pores of the internal walls, and the $H_2S$ suppressing material and/or the oxidation catalyst are thus introduced into the porous internal walls of the porous wall flow substrate. It is preferred according to the present disclosure that the wall flow substrate is a porous wall flow substrate, and that said at least one oxidation catalyst and/or said at least one $H_2S$ suppressing material have been introduced into the porous walls of the porous wall flow substrate.

As outlined above, the oxidation catalyst and the $H_2S$ suppressing material are separated by the internal walls of the wall flow filter substrate. Such configuration allows for two different embodiments, namely wherein the inlet coating comprises said at least one oxidation catalyst, i.e., said at least one oxidation catalyst is coated from the inlet side, and the outlet coating comprises said at least one $H_2S$ suppressing material, i.e., said at least one $H_2S$ suppressing material is coated from the outlet side, or vice versa wherein the inlet coating comprises said at least one H$_2$S suppressing material, i.e., said at least one H$_2$S suppressing material is coated form the inlet side, and the outlet coating comprises said at least one oxidation catalyst, i.e., said at least one oxidation catalyst is coated from the outlet side. In a preferred embodiment of the present disclosure, the inlet coating comprises said at least one H$_2$S suppressing material, and the outlet coating comprises said at least one oxidation catalyst.

Preferably, the oxidation catalyst comprises a platinum group metal ("PGM") component. The term "PGM" as used in the context of the present disclosure relates to ruthenium (Ru), rhodium (Rh), palladium (Pd), osmium (Os), iridium (Ir), and platinum (Pt). Preferred oxidation catalysts are PGM components wherein the PGM is selected from the group consisting of Pt, Pd, Rh, Ir and a mixture of two or more thereof. More preferably, the PGM is selected from the group consisting of Pt, Pd, and a mixture of Pt and Pd. Even more preferably, the PGM consists of a Pt, and does not contain any Pd, or it consists of Pd and does not contain any Pt.

If the PGM of the oxidation catalyst contains, preferably consists, of a mixture of Pd and Pt, there are no specific restrictions as far as the weight ratio of Pt:Pd is concerned. Typically, the weight ratio in the oxidation catalyst is in the range of from 10:1 to 1:10, preferably from 9:1 to greater than 1:1, more preferably from 8:1 to 1.1:1, more preferably from 7:1 to 1.2:1, more preferably from 6:1 to 1.3:1, more preferably from 5:1 to 1.4:1, more preferably from 4:1 to 1.5:1. In another preferred embodiment, the weight ratio of Pt: Pd is in the range of from 20:1 to 1:1, more preferably from 10:1 to 2:1, more preferably from 8:1 to 2:1.

In a preferred embodiment of the present disclosure, the oxidation catalyst is supported on at least one support material. While there are no specific restrictions, it is preferred that the support material is a porous support material, further preferably, the porous support material is a refractory metal oxide. More preferably, the porous support material is selected from the group consisting of alumina, zirconia, silica, titania, a rare earth metal oxide such as an oxide of cerium, prasedodymium, lanthanum, neodymium and samarium, silica-alumina, alumino-silicates, alumina-zirconia, alumina-chromia, alumina-rare earth metal oxide, titania-silica, titania-zirconia, titania-alumina, and a mixture of two or more thereof. Even more preferably, the at least one porous support material is selected from the group consisting of Al$_2$O$_3$, ZrO$_2$, CeO$_2$, SiO$_2$ and a mixture of two or more thereof. In a specifically preferred embodiment, the oxidation catalyst is supported on a support material consisting of SiO$_2$/Al$_2$O$_3$, preferably containing about 5% SiO$_2$.

The H$_2$S suppressing material as used in the present disclosure preferably comprises a metal selected from the group consisting of compounds of Cu, Mn, Fe, Ni and mixtures thereof. In a further preferred embodiment, the H$_2$S suppressing material comprises an oxide of a metal selected form the group consisting of Cu, Mn, Fe, Ni and mixtures thereof. As is understood by the skilled person, the term "metal" in connection with the present disclosure is not used to denominate an element, such as Cu or Fe, in its metallic, i.e., elementary form, but rather refers to the chemical group of metals these elements belong to, and comprises the element in any oxidation state or chemical composition, in particular as an oxide.

In a further preferred embodiment of the present disclosure, the H$_2$S suppressing material comprises Cu, preferably an oxide of Cu, further preferably CuO, and most preferably CuO in the tenorite phase.

It was surprisingly found, supported by the experimental results as shown below (see especially Example 3) that the use of CuO, in particular in the tenorite phase, reduces the increase in back pressure and shows little or no interaction with the oxidation catalyst, resulting in a good CO conversion rate of the oxidation catalyst when used in combination with CuO, in particular in the tenorite phase, and simultaneously providing a good H$_2$S suppressing function.

As detailed above, a preferred compound used as H$_2$S suppressing material is CuO, in particular in the tenorite phase. It is further preferred according to the present disclosure that the H$_2$S suppressing material comprises CuO, in particular in the tenorite phase, having an average crystallite size of the CuO of at least 30 nm, preferably at least 40 nm, and more preferably at least 50 nm, as measured by X-ray diffraction (XRD). The particles comprising the CuO crystallites of the corresponding size may be composed of several crystallites forming a particle. The particle size of these CuO particles is preferably $D_{90}$<100 μm, or $D_{90}$<85 μm, or $D_{90}$<50 μm.

It was surprisingly found, supported by the experimental results as shown below (see especially Example 3) that the use of CuO, in particular in the tenorite phase, having such crystallite size reduces the increase in back pressure and shows little or no interaction with the oxidation catalyst, resulting in a good CO conversion rate of the oxidation catalyst when used in combination with CuO, in particular in the tenorite phase, having such crystallite size, and simultaneously providing a good H$_2$S suppressing function.

In another preferred embodiment of the present disclosure, the H$_2$S suppressing material has a BET surface of less than 5 m$^2$/g, preferably less than 2 m$^2$/g. Such low BET surface of the H$_2$5 suppressing material appears to be especially advantageous regarding the back pressure and the CO conversion rate of the oxidation catalyst, as also shown in Example 3 below. In view of the foregoing paragraphs, it is thus particularly preferred to use CuO in the tenorite phase having an average crystallite size of the CuO of at least 30 nm, preferably at least 40 nm, and more preferably at least 50 nm, as measured by X-ray diffraction (XRD), and a BET surface of less than 5 m$^2$/g, preferably less than 2 m$^2$/g. The BET surface area is measured according to DIN 66131.

The catalyzed soot filter of the present disclosure may comprise a wall flow substrate. In the alternative, a cyclone filter may be used. Wall flow substrates useful for the catalyzed soot filter of the present disclosure have a plurality of fine, substantially parallel flow passages extending along the longitudinal axis of the substrate. Each passage is blocked at one end of the substrate body, with alternate passages blocked at opposite end-faces. Such monolithic carriers may contain up to about 400 flow passages (or "cells") per square inch ((2.54 cm)$^2$) of cross section, although far fewer may be used. For example, the carrier may have from 7 to 400, preferably from 100 to 400, cells per square inch ("cpsi"). The cells can have cross sections that are rectangular, square, circular, oval, triangular, hexagonal, or are of other polygonal shapes.

Preferred wall flow substrates are composed of ceramic-like materials such as cordierite, alpha-alumina, silicon carbide, silicon nitride, zirconia, mullite, spodumene, alumina-silicamagnesia or zirconium silicate, or of refractory metals such as stainless steel. Preferred wall flow substrates are formed from cordierite, aluminum titanate and/or silicon carbide. Such materials are able to withstand the environment, particularly high temperatures, encountered in treating the exhaust streams. Ceramic wall flow substrates are typically formed of a material having a porosity of about 40 to 70. The term "porosity" as used in this context is understood as being determined according to mercury porosity measurement according to DIN 66133. According to the present disclosure, wall flow substrates are preferred having a porosity in the range from 38 to 75.

Therefore, the present disclosure also relates to a catalyzed soot filter as defined above, wherein the wall flow substrate has a porosity in the range of from 38 to 75, determined according to mercury porosity measurement according to DIN 66133, wherein the wall flow substrate is preferably a cordierite substrate or a silicon carbide substrate.

Generally, there are no restrictions as to the substrate axial lengths of the catalyzed soot filter of the present disclosure. Substrate axial lengths will mainly depend on the intended use of the catalyzed soot filter of the present disclosure. Typical substrate axial lengths of catalyzed soot filter used, for example, in the automotive area are in the range of from 4 to 10 inches (10.16 to 25.4 cm), preferably from 5 to 8 inches (12.7 to 20.32 cm).

The coatings of the present disclosure present on the wall flow substrate may be formed from a respective washcoat composition that contains the at least one porous support material as described above. Other additives such as binders and stabilizers can also be included in the washcoat composition. Such stabilizers can be included in either the first coating or in the second coating or in both first and second coatings, as described hereinunder. As disclosed in U.S. Pat. No. 4,727,052, porous support materials, such as activated alumina, can be thermally stabilized to retard undesirable alumina phase transformations from gamma to alpha at elevated temperatures. Stabilizers can be selected from at least one alkaline earth metal components selected from the group consisting of magnesium, barium, calcium and strontium, preferably strontium and barium. When present, stabilizers materials are added at from about 0.01 g/in$^3$ (g/(2.54 cm)$^3$) to 0.15 g/in$^3$ (g/(2.54 cm)$^3$) in the coating.

A given coating is disposed on the surface of the internal walls. Further, it is conceivable that a given coating is disposed on another coating which had been applied onto the surface of the internal walls or onto yet another coating. Further, a given coating may partially permeate the porous internal walls or the coating onto which it is applied.

A given washcoat can be applied as coating according to any conceivable method. For example, it is conceivable to apply a washcoat by spraying a washcoat onto the internal walls of the wall flow substrate. According to the present disclosure, it is preferred to apply a given washcoat-in the internal walls of the wall flow substrate by dip-coating.

In particular if PGM components are used as oxidation catalysts, a washcoat composition to be applied onto or into the internal walls of the wall flow substrate is preferably prepared by dispersing a suitable PGM component precursor on the a suitable porous support material, preferably a suitable refractory metal oxide as described hereinabove. More preferably, a water-soluble or water-dispersible PGM component precursor is impregnated on a suitable porous support material, preferably a suitable refractory metal oxide, followed by drying and fixing steps. Suitable PGM component precursors include, for example, potassium platinum chloride, ammonium platinum thiocyanate, amine-solubilized platinum hydroxide, chloroplatinic acid, palladium nitrate, rhodium chloride, rhodium nitrate, hexamine rhodium chloride, and the like. Other suitable PGM component precursors will be apparent to those of skill in the art. The impregnated support material is preferably dried with the PGM component fixed thereon. Generally, drying temperatures are in the range from 60 to 250° C., preferably from 90 to 210° C., more preferably from 100 to 150° C. Drying can be carried out in any suitable atmosphere, with nitrogen or air. After drying, it is preferred to finally fix the PGM component on the support material by suitable calcination and/or other suitable methods such as treatment with acetic acid. In general, any method resulting in the PGM component being in water-insoluble form is suitable. Generally, calcination temperatures are in the range from 250 to 800° C., preferably from 350 to 700° C., more preferably from 400 to 600° C. Calcination can be carried out in any suitable atmosphere, with nitrogen or air. By, for example, calcination, the catalytically active elemental PGM or its oxide is obtained. It is to be understood that the term "PGM component" present in the final catalyzed soot filter as used in the context of the present disclosure relates to the PGM in the form of the catalytically active elemental PGM, or the oxide thereof, or the mixture of elemental PGM and the oxide thereof.

Similarly, also the H$_2$S suppressing material may be applied to the wall flow substrate in the form of a washcoat composition. In this context, the same support materials, measures, and methods as described above in connection with the oxidation catalyst, in particular the PGM component, may be used and applied.

In another preferred embodiment of the present disclosure, the H$_2$S suppressing material is supported on a support material not containing alumina (Al$_2$O$_3$), and further preferably the H$_2$S suppressing material is not supported on a support material at all. It was surprisingly found, supported by the Experiments disclosed below (see Example 4) that non-supported or unsupported H$_2$S suppressing material, or at least not supported on an Al containing support material, shows an increased H$_2$S suppression or conversion rate.

Generally, there are no specific restrictions as far as the loading of the coating comprising the H$_2$S suppressing material are concerned. The term "loading" of a given coating as used in the context of the present disclosure refers to a loading which is determined by weight measurement of the wall flow substrate used according to the present disclosure before and after having suitably applied the respective coating, followed by drying and calcination of the catalyzed soot filter as described hereinunder.

Preferably, the catalyzed soot filter of the present disclosure exhibits a coating comprising the H$_2$S suppressing material with a loading in the range of from 0.05 to 1 g/inch$^3$ (g/(2.54 cm)$^3$). Preferably, the coating comprising the H$_2$S suppressing material is present with a loading in the range of from 0.06 to 0.9, more preferably from 0.07 to 0.8, more preferably from 0.08 to 0.7, more preferably from 0.09 to 0.6, and even more preferably from 0.1 to 0.5 g/inch$^3$ (g/(2.54 cm)$^3$). Even more preferably, the coating comprising the H$_2$S suppressing material is present with a loading in the range of from 0.15 to 0.4, more preferably from 0.2 to 0.3 g/inch$^3$ (g/(2.54 cm)$^3$).

Similarly, there are no specific restrictions as far as the loading the coating comprising the oxidation catalyst are concerned. Preferably, the catalyzed soot filter of the present disclosure exhibits a coating comprising the oxidation catalyst with a loading in the range of from 0.05 to 1.5 g/inch$^3$ (g/(2.54 cm)$^3$). Preferably, the coating comprising the oxidation catalyst is present with a loading in the range of from 0.05 to 1, more preferably from 0.05 to 0.75, and even more preferably from 0.05 to 0.25 g/inch$^3$ (g/(2.54 cm)$^3$). Even more preferably, the inlet coating is present with a loading in the range of from 0.05 to 0.15, more preferably from 0.05 to 0.075 g/inch$^3$ (g/(2.54 cm)$^3$).

Therefore, the present disclosure relates to the catalyzed soot filter as defined above, wherein the loading of the coating comprising the H$_2$S suppressing material is in the range of from 0.05 to 1, preferably from 0.1 to 0.5, more preferably from 0.2 to 0.3 g/inch$^3$ (g/(2.54 cm)$^3$), and wherein the loading of the coating comprising the oxidation catalyst is in the range of from 0.05 to 1.5, preferably from 0.05 to 0.25, more preferably from 0.05 to 0.075 g/inch$^3$ (g/(2.54 cm)$^3$).

Furthermore, any of the oxidation catalyst and the H$_2$S suppressing material may be supported on a support material. Even though this particularly applies to the oxidation catalyst, the following may also be transferred to the H$_2$S suppressing material. The oxidation catalyst is preferably applied to the filter substrate on a support material, as detailed above. If the oxidation catalyst is supported, it may be present on the support material at any feasible amount, in other words, the loading of the oxidation catalyst on a support material is not limited in any way. It is preferred in this context that the loading of the oxidation catalyst on the support material is in the range of from 0.05 to 5 g/ft$_3$ (g/(30.48 cm)$^3$), preferably from 0.1 to 4 g/ft$_3$ (g/(30.48 cm)$^3$), further preferably from 0.5 to 3 g/ft$_3$ (g/(30.48 cm)$^3$), and most preferred from 1 to 2 g/ft$_3$ (g/(30.48 cm)$^3$).

The present disclosure also pertains to a process for manufacturing such catalyzed soot filter, comprising the steps of (i) providing a wall flow substrate, preferably having a porosity in the range of from 38 to 75, determined according to mercury porosity measurement according to DIN 66133, wherein the wall flow substrate is preferably a cordierite substrate or a silicon carbide substrate, said wall flow substrate comprising an inlet end, and outlet end, a substrate axial length extending between the inlet end and the outlet end, and a plurality of passages defined by the internal walls of the wall flow substrate;
  wherein the plurality of passages comprise inlet passages having an open inlet end and a closed outlet end, and outlet passages having a closed inlet end and an open outlet end;
  wherein a given inlet passage, an adjacent outlet passage, and the internal wall between said inlet and said outlet passage define an overall passage;
(ii) applying a first coating to at least part of the internal walls of at least 25% of the overall passages such that the first coating extends from the inlet end to a first coating end whereby an inlet coating length is defined, wherein the inlet coating length is x % of the substrate axial length, with 25=x≤100, said first coating comprising at least one oxidation catalyst or at least one H$_2$S suppressing material;
(iii) applying a second coating to at least part of the internal walls of at least 25% of the overall passages such that the second coating extends from the outlet end to a second coating end whereby an outlet coating length is defined, wherein the outlet coating length is y % of the substrate axial length, with 25≤y≤100, said second coating comprising at least one oxidation catalyst or at least one H$_2$S suppressing material;
  wherein one of the inlet coating and the outlet coating comprises at least one oxidation catalyst, and the other of the inlet coating and the outlet coating comprises at least one H$_2$S suppressing material, and said at least one oxidation catalyst and said at least one H$_2$S suppressing material are separated by the internal walls of the wall flow filter substrate, and the total coating length is x+y, and x+y≥100.

It is understood that all preferred embodiments and structural restrictions as well as all materials and methods described above in relation to the catalyzed soot filter are also applicable to the process for manufacturing, mutatis mutandis. Accordingly, preferred values, ranges of values, such as concentrations, lengths, amounts and ratios as defined above in relation to the catalyzed soot filter also apply to the process for manufacturing such catalyzed soot filter.

According to the present disclosure, step (ii) may be carried out before step (iii) whereby the inlet coating is applied prior to the outlet coating.

Therefore, the present disclosure also relates to a process for manufacturing a catalyzed soot filter as defined above, wherein step (ii) is carried out before step (iii) and wherein the inlet coating is applied prior to the outlet coating.

According to the present disclosure, step (iii) may be carried out before step (ii) whereby the outlet coating is applied prior to the inlet coating.

Therefore, the present disclosure also relates to a process for manufacturing a catalyzed soot filter as defined above, wherein step (iii) is carried out before step (ii) and wherein the outlet coating is applied prior to the inlet coating.

It is preferred according to the present disclosure that the H$_2$S suppressing material is first coated onto the wall flow substrate, followed by the oxidation catalyst. Thus, depending on whether the H$_2$S suppressing material is coated onto the inlet or outlet side, the inlet or outlet side, respectively, is coated first with the H$_2$S suppressing material, followed by the coating of the oxidation catalyst on the respective other side.

The catalyzed soot filter of the present disclosure can be used in an integrated emission treatment system, in particular in an exhaust conduit comprising one or more additional components for the treatment of diesel exhaust emissions. For example, such exhaust conduit which is most preferably in fluid communication with the diesel engine may comprise a catalyzed soot filter according to the present disclosure and may further comprise a diesel oxidation catalyst (DOC) article and/or a selective catalytic reduction (SCR) article, an NOx storage and reduction (NSR) catalytic article and/or a lean NOx trap (LNT) article. Most preferably, the DOC article and/or the SCR article and/or the NSR article and/or the LNT article are in fluid communication with the catalyzed soot filter.

In a particularly preferred embodiment, the catalyzed soot filter of the present disclosure is arranged downstream of an article that produces H$_2$S. Such article may any of the above described articles, in particular an LNT article, i.e., an arrangement of the type LNT-CSF. However, the catalyzed soot filter of the present disclosure may as well be in an arrangement of the form LNT-SCR-CSF, in an arrangement of the form DOC-NSR-CSF, in an arrangement of the form DOC-SCR-CSF, or in an arrangement of the form DOC-CSF-SCR. Alternatively or additionally, the catalyzed soot filter of the present disclosure may as well be arranged in connection with a passive NOx adsorber.

Therefore, the present disclosure also relates to the catalyzed soot filter as defined above, comprised in a system for treating a diesel engine exhaust stream, the system comprising an exhaust conduit in fluid communication with the diesel engine via an exhaust manifold; a catalyzed soot filter as defined above;

and one or more of the following in fluid communication with the catalyzed soot filter: a diesel oxidation catalyst (DOC), a selective catalytic reduction (SCR) article, a NOx storage and reduction (NSR) catalytic article, a lean NOx trap (LNT) article, preferably wherein the catalyzed soot filter is arranged downstream of an article that produces $H_2S$, in particular downstream an LNT article.

A suitable SCR article for use in the exhaust conduit is typically able to catalyze the reaction of O2 with any excess $NH_3$ to $N_2$ and $H_2O$, so that $NH_3$ is not emitted to the atmosphere. Useful SCR catalyst compositions used in the exhaust conduit should also have thermal resistance to temperatures greater than 650° C. Such high temperatures may be encountered during regeneration of the upstream catalyzed soot filter. Suitable SCR articles are described, for instance, in U.S. Pat. Nos. 4,961,917 and 5,516,497. Suitable SCR articles include one or both of an iron and a copper promoter typically present in a zeolite in an amount of from about 0.1 to 30 percent by weight, preferably from about 1 to 5 percent by weight, of the total weight of promoter plus zeolite. Typical zeolites may exhibit a CHA framework structure.

Preferably, in this system, the catalyzed soot filter is arranged downstream of an LNT article. More preferably, the system does not contain a NOx reduction catalytic article, and more preferably, the system does not contain a NOx storage and reduction (NSR) catalytic article.

Therefore, the present invention also relates to a method of treating a diesel engine exhaust stream, the exhaust stream containing soot particles and $H_2S$, said method comprising contacting the exhaust stream with a catalyzed soot filter as defined above, preferably after having directed the exhaust stream through lean NOx trap (LNT) article which may produce $H_2S$.

The present invention also relates to the use of a catalyzed soot filter as defined above in the treatment of an exhaust stream, preferably an diesel engine exhaust stream, the exhaust stream containing soot particles, and wherein the exhausts stream is contacted with the catalyzed soot filter, further preferably wherein the exhaust soot filter is arranged downstream of an article that produces $H_2S$. The catalyzed soot filter may be used for automotive catalysis and/or for non-automotive catalysis, such as in other engines producing soot loaded exhaust streams.

Finally, the present invention also relates to the use of CuO in the tenorite phase as an $H_2S$ suppressing material, preferably wherein the average crystallite size of the CuO is at least 30 nm, further preferably at least 40 nm, and more preferably at least 50 nm. The preferred embodiments as detailed above in relation to the CuO material are also preferred embodiments of the use as $H_2S$ suppressing material.

In the following, the present disclosure is further illustrated by the Examples.

EXAMPLES

1. Decrease of H2S Slip by Increase of Coating Length of the $H_2S$ Suppression Material 1.1 Examples 1.1 to 1.4—Catalyst Preparation The filters of Examples 1.1 to 1.4 were prepared in an analogous manner, with different characteristics as outlined in Table 1 below.

CuO was suspended in water to make a slurry with a solid content of 30-40%; this slurry was milled to $D_{90}$<4 µm. The slurry was then diluted to 10% solid by weight.

Separately, a Pt containing slurry was made. A pre-milled $SiO_2/Al_2O_3$ powder (90% of the particles are less than 5 micrometers, $D_{90}$<5 µm) was suspended in water to reach 40% solid. A calculated amount (see Table 1 below) of platinum tetra monoethanolamine hydroxide solution was added into the suspension drop-wise while stirring.

A filter substrate made of silicon carbide with a porosity of about 42% of the mean pore size about 11 µm and a volume of 2.1 liter was provided. The CuO slurry was first coated from the inlet side of the filter. The substrate was immersed into the slurry with inlet side down with the outlet side held above the slurry level to the amount as indicated below in Table 1 in order to result in the corresponding inlet coverage. The substrate was pulled out of the slurry, and a stream of air was blown from the outlet side of the channels until no washcoat slurry was coming out from the inlet side. The coated sample was then dried at 110° C. for 2 hours and calcined in air at 450° C. for 1 hour, resulting in the below indicated percentage of the inlet side of the filter being coated with 0.25 g/in$^3$ (g/(2.54 cm)$^3$) CuO.

Similarly, the Pt slurry was then coated from the outlet side of the filter. The coated sample was then dried at 110° C. for 2 hours and calcined in air at 450° C. for 1 hour, resulting in the below indicated percentage of the outlet side of the filter being coated with Pt on 0.25 g/in$^3$ (g/(2.54 cm)$^3$) $SiO_2/Al_2O_3$ (5% $SiO_2$).

The samples was aged in an oven at 800° C. for 16 h with 10% water in air, resulting in a CSF having the coating characteristics as indicated in Table 1.

TABLE 1

| Sample No. | Inlet Coverage (%) | Inlet Washcoat | Outlet Coverage (%) | Outlet Washcoat |
|---|---|---|---|---|
| 1.1 | 25 | 0.25 g/in$^3$ CuO | 75 | 1.33 g/ft$^3$ Pt on 0.25 g/in$^3$ |
| 1.2 | 33 | 0.25 g/in$^3$ CuO | 67 | 1.49 g/ft$^3$ Pt on 0.25 g/in$^3$ |
| 1.3 | 50 | 0.25 g/in$^3$ CuO | 50 | 2 g/ft$^3$ Pt on 0.25 g/in$^3$ |
| 1.4 | 100 | 0.25 g/in$^3$ CuO | 100 | 1 g/ft$^3$ Pt on 0.05 g/in$^3$ |

1.2 Example 1.5—Test Procedure of $H_2S$ Suppression Evaluation

The respective CSF of Examples 1.1 to 1.4 was tested downstream an LNT which was loaded with sulfur prior testing. The combined LNT+CSF samples were placed in the exhaust stream of a 4 cylinder light duty diesel engine with 2 L engine displacement.

For $H_2S$ suppression evaluation a desulfation procedure (DeSOx) was applied to the LNT. In this procedure, the Air to Fuel ratio (Lambda) varied between 0.95 (30 s) and 1.05 (10 s) for a total of 10 min. During the DeSOx procedure, $H_2S$ (500 ppm) was emitted from the LNT and entered the respective CSF. The temperature in front of the catalyzed soot filter was 600-650° C. and the gas flow 260 kg/h. During the DeSOx procedure, the $H_2S$ is converted to $SO_2$. The $H_2S$ concentration in the CSF emissions was monitored by a mass spectrometer.

Figure 1:
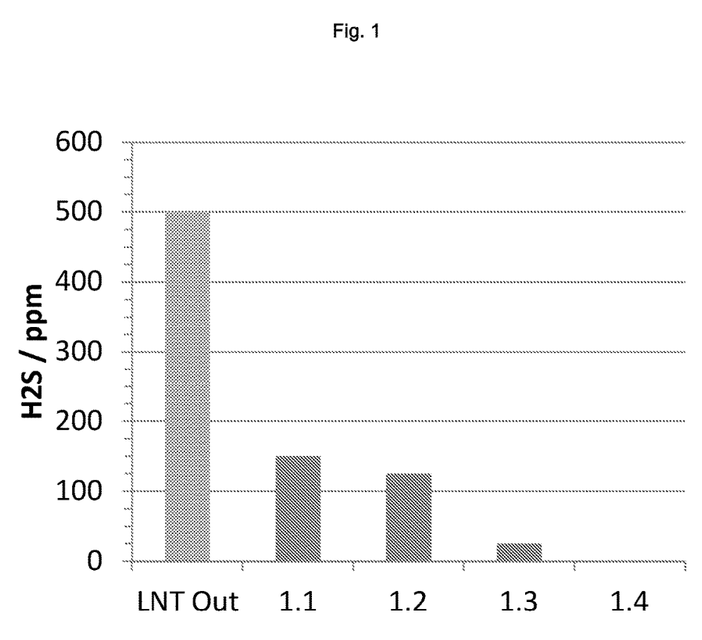
FIG. 1 shows the $H_2S$ emission of Examples 1.1 to 1.4 during the desulfation of a sulfur loaded LNT.

FIG. 1 shows the $H_2S$ emission of the four samples Example 1.1 to 1.4 during the desulfation of a sulfur loaded LNT in ppm $H_2S$. The LNT provides 500 ppm of $H_2S$ (LNT Out), and the four samples show an $H_2S$ emission of between 200 ppm (CSF of Example 1.1) and below 25 ppm (CSF of Example 1.4). It becomes clear from these results that the longer the coating zone of the H₂S suppression material (CuO), the lower the H₂S emission.

2. Decrease of CO Emission by Separation of Coatings 2.1 Example 2.1(Comparative)—Catalyst Preparation with a Uniform Coating on 100% of Inlet Side Example 2.1 contains 1.5 g/ft³ (g/(30.48 cm)³) Pt on 0.1 g/in³ (g/(2.54 cm)³) SiO₂/Al₂O₃ (5% SiO₂) and 0.4 g/in³ (g/(2.54 cm)³) CuO. The composition is the same throughout the length of the filter.

To prepare a catalyst coating slurry, a pre-milled SiO₂/Al₂O₃ powder (90% of the particles are less than 5 micrometers, $D_{90}$<5 µm) is suspended in water to reach about 40% solid. A calculated amount of platinum tetra monoethanolamine hydroxide solution was added into the suspension drop-wise while stirring.

The CuO powder suspended in water to make a slurry with a solid content of 30-40%; this slurry was milled to $D_{90}$<4 µm. A calculated amount of this slurry was mixed with the calculated amount of Pt slurry to reach the component ratios set in the catalyst composition. The combined slurry was then diluted to 14% solid by weight.

A filter substrate made of silicon carbide with a porosity of about 42% of the mean pore size about 11 µm and a volume of 2.1 liter was provided. The slurry was then washcoated by immersing the filter substrate into the slurry with inlet side of the substrate down and the outlet side just above (about ¼ inch) the slurry level. The substrate was pulled out of the slurry, and a stream of air was blown from the outlet side of the channels until no washcoat slurry was coming out from the inlet side. The coated sample was then dried at 110° C. for 2 hours and calcined in air at 450° C. for 1 hour, resulting in a 100% coating of the inlet side of the filter with 1.5 g/ft³ (g/(30.48 cm)³) Pt on 0.1 g/in³ (g/(2.54 cm)³) SiO₂/Al₂O₃ (5% SiO₂) and 0.4 g/in³ (g/(2.54 cm)³) CuO.

The sample was aged in an oven at 800° C. for 16 h with 10% water in air.

2.2 Example 2.2(Inventive)—Catalyst Preparation with a CuO Coating on 100% of Inlet Side and a Pt Coating on 100% of Outlet Side Example 2.2 contains 1.0 g/ft³ (g/(30.48 cm)³) Pt on 0.05 g/in³ (g/(2.54 cm)³) SiO₂/Al₂O₃ (5% SiO₂) and 0.25 g/in³ (g/(2.54 cm)³) CuO. The composition is the same throughout the length of the filter.

CuO was suspended in water to make a slurry with a solid content of 30-40%; this slurry was milled to $D_{90}$<4 µm. The slurry was then diluted to 10% solid by weight.

Separately, a Pt containing slurry was made. A pre-milled SiO₂/Al₂O₃ powder (90% of the particles are less than 5 micrometers, $D_{90}$<5 µm) was suspended in water to reach 40% solid. A calculated amount of platinum tetra monoethanolamine hydroxide solution was added into the suspension drop-wise while stirring.

A filter substrate made of silicon carbide with a porosity of about 42% of the mean pore size about 11 µm and a volume of 2.1 liter was provided. The CuO slurry was first coated from the inlet side of the filter. The substrate was immersed into the slurry with inlet side down with the outlet side held ¼ inch (2.54 cm) above the slurry level. The substrate was pulled out of the slurry, and a stream of air was blown from the outlet side of the channels until no washcoat slurry was coming out from the inlet side. The coated sample was then dried at 110° C. for 2 hours and calcined in air at 450° C. for 1 hour, resulting in 100% of the inlet side of the filter being coated with 0.25 g/in³ (g/(2.54 cm)³) CuO.

Similarly, the Pt slurry was then coated from the outlet side of the filter. The coated sample was then dried at 110° C. for 2 hours and calcined in air at 450° C. for 1 hour, resulting in 100% of the outlet side of the filter being coated with 1.0 g/ft³ (g/(30.48 cm)³) Pt on 0.05 g/in³ (g/(2.54 cm)³) SiO₂/Al₂O₃ (5% SiO₂).

The sample was aged in an oven at 800° C. for 16 h with 10% water in air, resulting in a filter that contains 1.0 g/ft³ (g/(30.48 cm)³) Pt on 0.05 g/in³ (g/(2.54 cm)³) SiO2/Al₂O₃ (5% SiO₂) and 0.25 g/in³ (g/(2.54 cm)³) CuO, with a homogeneous coating throughout the length of the filter.

2.3 Example 2.3—Comparison of Secondary CO Emission

An uncoated filter substrate (filter substrate made of silicon carbide with a porosity of about 42% of the mean pore size about 11 µm and a volume of 2.1 liter) and the two filter substrates of Examples 2.1 and 2.2 were tested for CO oxidation during active filter regeneration of soot loading filter (secondary CO emission). During soot oxidation a high amount of CO is produced which needs to be oxidized to CO₂ over the filter substrate by the oxidation catalyst.

Prior testing, the samples were loaded with 11 g/l soot in the exhaust stream of a 4 cylinder light duty diesel engine with 2 L engine displacement.

For active regeneration testing each of the three samples was placed downstream a standard diesel oxidation catalyst (DOC) in the exhaust line of a 4 cylinder light duty diesel engine with 2 L displacement. The temperature in front of the catalyzed soot filter was risen to 620° C. for 10 min. The CO concentration is monitored. The generated amount from soot burning is represented by the CO emissions of the uncoated filter substrate.

Figure 2:
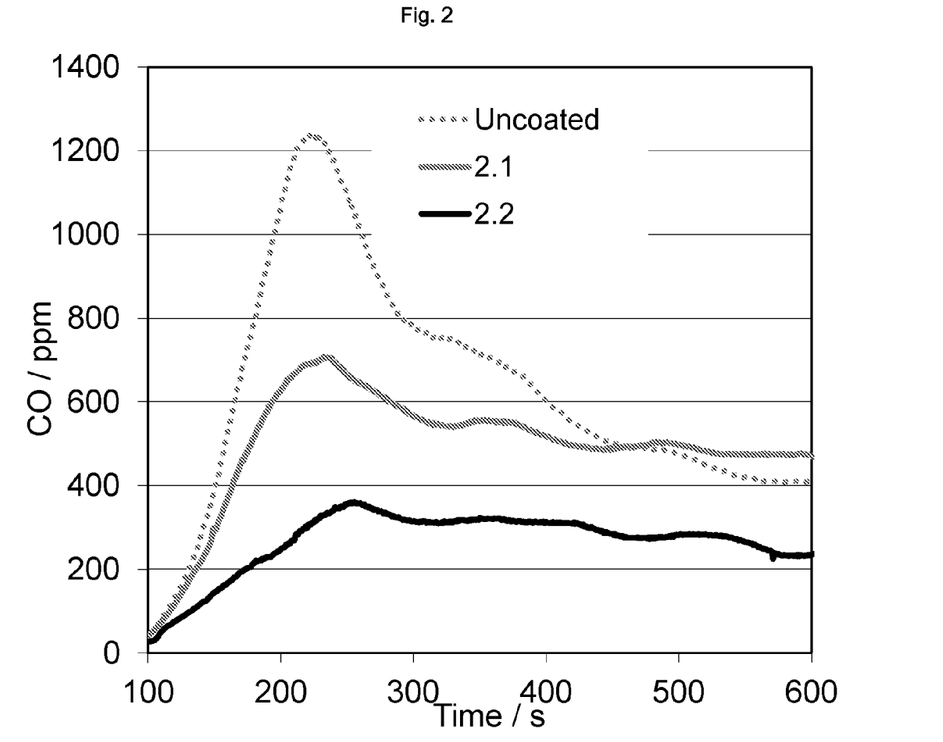
FIG. 2 shows the CO emission [in ppm] during active filter regeneration of an uncoated filter, the filter of comparative Example 2.1, and of Example 2.2 in the first 600 seconds of regeneration.
Figure 3:
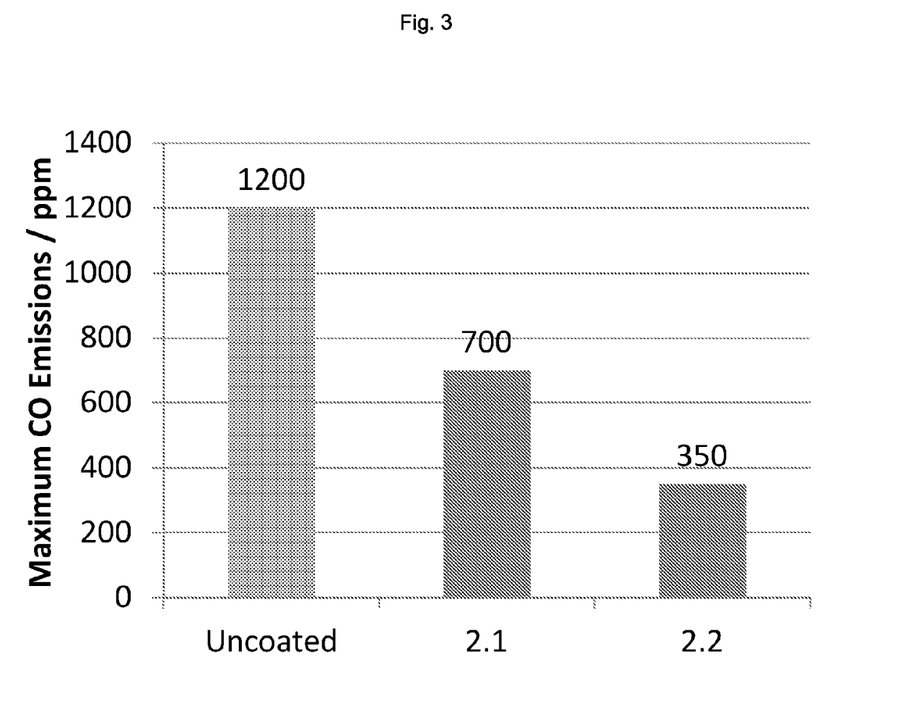
FIG. 3 shows the maximum CO emission [in ppm] during active filter regeneration of an uncoated filter, the filter of comparative Example 2.1, and of Example 2.2.

As can be seen from FIGS. 2 and 3, the secondary CO emission during active filter regeneration is reduced in the filter of Example 2.2 (maximum 350 ppm), compared to the uncoated filter and the filter of Example 2.1 (maximum 700 ppm) and the uncoated filter (maximum 1200 ppm).

2.4 Example 2.4—Comparison of H2S Suppression

The samples of Examples 2.1 and 2.2 were tested for H₂S suppression during active filter regeneration of soot loading filter. Both filters show a H₂S emission of less than 20 ppm during active filter regeneration.

3. Reduction of Back Pressure 3.1 Examples 3.1 to 3.3—Catalyst Preparation with Different CuO Coating Examples 3.1 to 3.3 contain 2.0 g/ft³ (g/(30.48 cm)³) Pd on 0.05 g/in³ (g/(2.54 cm)³) SiO₂/Al₂O₃ (5% SiO₂) and 0.25 g/in³ (g/(2.54 cm)³) CuO. The composition is the same throughout the length of the filter.

General Procedure:

CuO was suspended in water to make a slurry with a solid content of 30-40%; this slurry was milled to $D_{90}$<4 µm. The slurry was then diluted to 10% solid by weight.

Separately, a Pd containing slurry was made. A pre-milled SiO₂/Al₂O₃ powder (90% of the particles are less than 5 micrometers, $D_{90}$<5 µm) was suspended in water to reach 40% solid. A calculated amount of palladium nitrate solution was added into the suspension drop-wise while stirring.

A filter substrate made of silicon carbide with a porosity of about 42% of the mean pore size about 11 µm and a volume of 2.1 liter was provided. The CuO slurry was first coated from the inlet side of the filter. The substrate was immersed into the slurry with inlet side down with the outlet side held ¼ inch (2.54 cm) above the slurry level. The substrate was pulled out of the slurry, and a stream of air was blown from the outlet side of the channels until no washcoat slurry was coming out from the inlet side. The coated sample was then dried at 110° C. for 2 hours and calcined in air at 450° C. for 1 hour, resulting in 100% of the inlet side of the filter being coated with 0.25 g/in³ (g/(2.54 cm)³) CuO.

Similarly, the Pd slurry was then coated from the outlet side of the filter. The coated sample was then dried at 110° C. for 2 hours and calcined in air at 450° C. for 1 hour, resulting in 100% of the outlet side of the filter being coated with 2.0 g/ft$^3$ (g/(30.48 cm)$^3$) Pd on 0.05 g/in$^3$ (g/(2.54 cm)$^3$) SiO$_2$/Al$_2$O$_3$ (5% SiO$_2$).

The sample was aged in an oven at 800° C. for 16 h with 10% water in air, resulting in a filter that contains 1.0 g/ft$^3$ (g/(30.48 cm)$^3$) Pt on 0.05 g/in$^3$ (g/(2.54 cm)$^3$) SiO$_2$/Al$_2$O$_3$ (5% SiO$_2$) and 0.25 g/in$^3$ (g/(2.54 cm)$^3$) CuO, with a homogeneous coating throughout the length of the filter.

Example 3.1

The CuO used has a composition (determined by X-ray fluorescence, XRF) of 96.7% CuO, 1.1% Al$_2$O$_3$ and 0.6% SiO$_2$. The CuO is in the tenorite phase and the average crystallite size is 15 nm. The BET surface of the CuO powder is 3.66 m$^2$/g. Prior to dispersing the CuO powder, the particle size distribution (PSD) is as follows: $D_{90}$<29.6 μm, $D_{50}$<8.4 μm and $D_{10}$<1.7 μm.

Example 3.2

The CuO used has a composition (determined by X-ray fluorescence, XRF) of 92.4% CuO, 3.9% Al$_2$O$_3$ and 2.2% SiO$_2$. The CuO is in the tenorite phase and the average crystallite size is 15 nm. The BET surface of the CuO powder is 2.32 m$^2$/g. Prior to dispersing the CuO powder, the particle size distribution is as follows: $D_{90}$<84.0 μm, $D_{50}$<64.4 μm and $D_{10}$<20.0 μm.

Example 3.3

The CuO used has a composition (determined by X-ray fluorescence, XRF) of 95.5% CuO, 2.0% Al$_2$O$_3$ and 0.7% SiO$_2$. The CuO is in the tenorite phase and the average crystallite size is 55 nm. The BET surface of the CuO powder is 0.94 m$^2$/g. Prior to dispersing the CuO powder, the particle size distribution is as follows: $D_{90}$<33.6 μm, $D_{50}$<16.3 μm and $D_{10}$<5.2 μm.

In all three above given Examples 3.1 to 3.3, the Nitrogen Pore Size distribution and Surface Area analysis are measured with a Micromeritics TriStar 3000 series instruments. They are degassed for a total of 6 hours (a 2 hour ramp up to 300° C. then held at 300° C. for 4 hours, under a flow of dry nitrogen) on a Micromeritics SmartPrep degasser. BET surface area is determined using 5 partial pressure points between 0.08 and 0.20. Nitrogen pore size (BJH) is determined using 33 desorption points.

Sample size is determined by an estimated surface given by the customer and using the equation: (estimated surface)*(sample weight)=between 10 and 50. This is a general rule, but a sample weight above or below the calculated value will not change the surface area outcome, only the length of time the analysis takes, i.e. longer analysis for too much sample.

3.2 Example 3.4—Comparison of Secondary CO Emission

An uncoated filter substrate (filter substrate made of silicon carbide with a porosity of about 42% of the mean pore size about 11 μm and a volume of 2.1 liter) and the three filter substrates of Examples 3.1 to 3.3 were tested for CO oxidation during active filter regeneration of soot loading filter (secondary CO emission). During soot oxidation a high amount of CO is produced which needs to be oxidized to CO$_2$ over the filter substrate by the precious metal.

Prior testing, the samples were loaded with 11 g/l soot in the exhaust stream of a 4 cylinder light duty diesel engine with 2 L engine displacement.

For active regeneration testing each of the tree samples was placed downstream a standard diesel oxidation catalyst (DOC) in the exhaust line of a 4 cylinder light duty diesel engine with 2 L displacement. The temperature in front of the catalyzed soot filter was risen to 620° C. for 10 min. The CO concentration is monitored. The generated amount from soot burning is represented by the CO emissions of the uncoated filter substrate.

Figure 4:
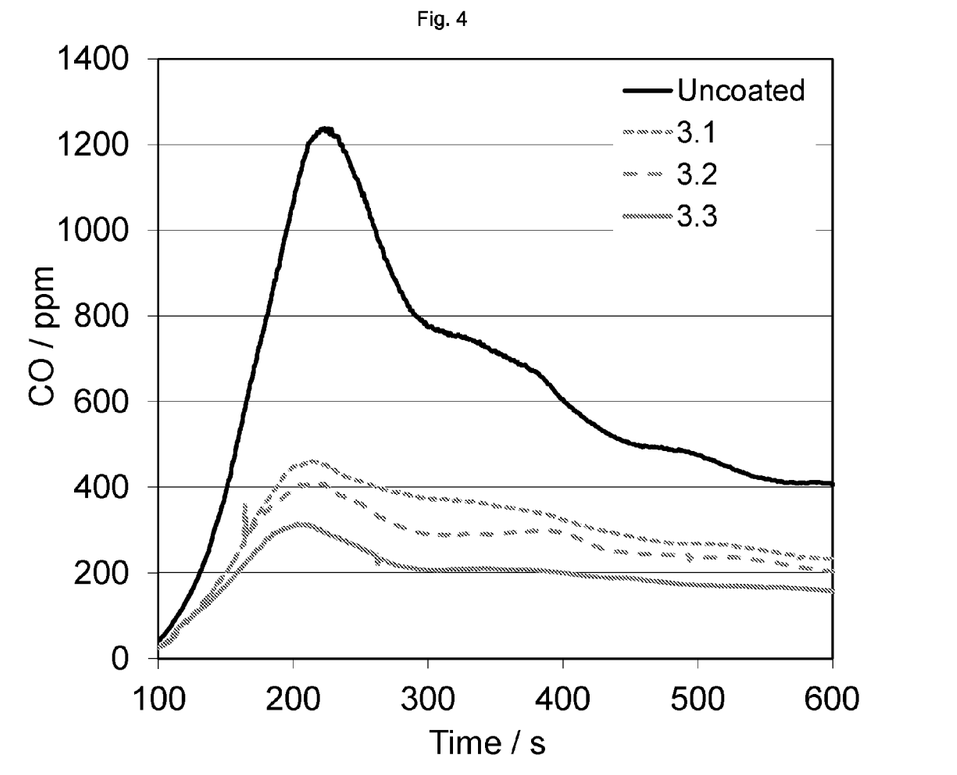
FIG. 4 shows the CO emission [in ppm] during active filter regeneration of an uncoated filter and the filters of Example 3.1 to 3.3 in the first 600 seconds of regeneration.
Figure 5:
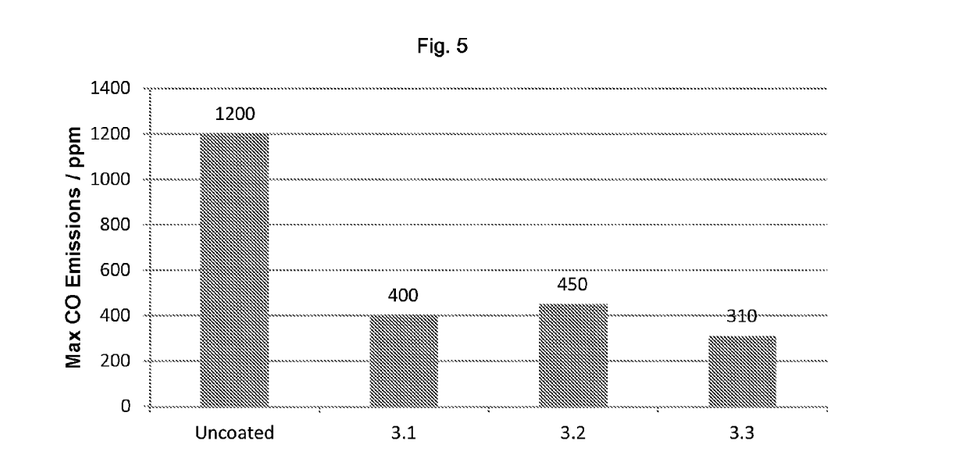
FIG. 5 shows the maximum CO emission [in ppm] during active filter regeneration of an uncoated filter and the filters of Example 3.1 to 3.3.

As can be seen from FIGS. 4 and 5, the secondary CO emission during active filter regeneration is the lowest in the filter of Example 3.3, compared to the uncoated filter and the filter of Examples 3.1 and 3.2.

3.3 Example 3.5—Comparison of H2S Suppression

The filters of Examples 3.1 to 3.3 were tested for H$_2$S suppression during active filter regeneration of soot loading filter. All three filters show a H$_2$S emission of less than 20 ppm during active filter regeneration.

3.4 Example 3.6—Comparison of Back Pressure Using Different Types of CuO

The back pressure increase of the filters was measured on a flow bench with air flow at 20° C. (cold flow bench). The respective filter was mounted in a sample holder in such a way that the total air flow is forced to pass the filter.

The air flow was adjusted to 600 m$^3$/h. The back pressure increase of the respective filter was measured as the difference of the pressure downstream and upstream of the filter substrate.

Figure 6:
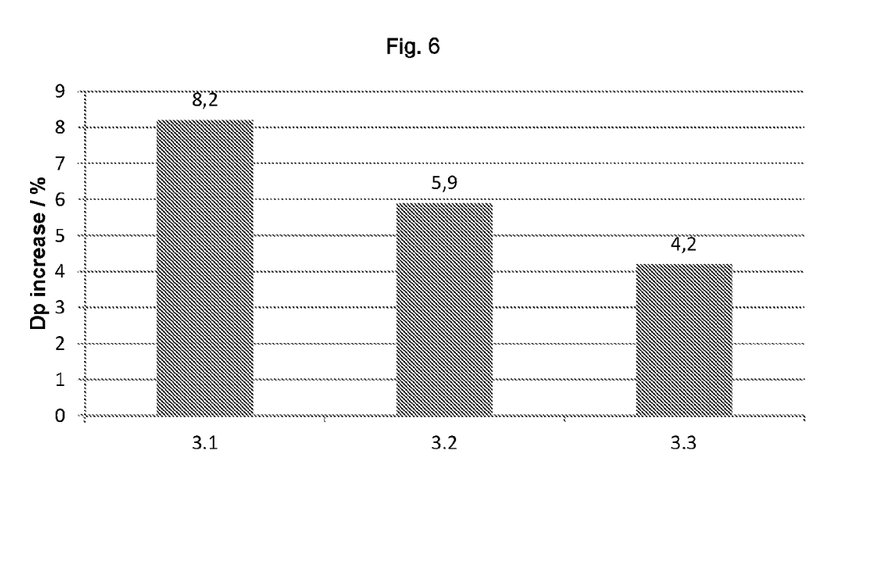
FIG. 6 shows the increase in back pressure (Dp) in % of a filter according to Examples 3.1 to 3.3, compared to an uncoated filter.

The back pressure increase of the uncoated and coated substrates (Examples 3.1, 3.2 and 3.3) was measured. The back pressure increase (Dp) of the coated filters in percent was calculated from the back pressure increase of the coated filter and the uncoated filter:

$$Dp = \frac{Dp(\text{coated}) - Dp(\text{uncoated})}{Dp(\text{uncoated})} \times 100\%$$

The results are shown in FIG. 6. As can be seen, the filter of Example 3.3 shows the least increase in back pressure.

4. Non-Supported CuO 4.1 Example 4.1—Catalyst Preparation with CuO Supported on SiO$_2$/Al$_2$O$_3$ Example 4.1 contains 2 g/ft$^3$ (g/(30.48 cm)$^3$) Pt on 0.1 g/in$^3$ (g/(2.54 cm)$^3$) SiO$_2$/Al$_2$O$_3$ (5% SiO$_2$) and 0.3 g/in$^3$ (g/(2.54 cm)$^3$) of the CuO supported on SiO$_2$/Al$_2$O$_3$ (5% SiO$_2$) material, where the CuO loading is 15% by weight.

Cu nitrate solution was first impregnated on SiO$_2$/Al$_2$O$_3$ support using the incipient wetness technique to reach 15% CuO loading by weight. The impregnated powder was dried at 110° C. overnight and then calcined at 500° C. for 2 hours in air in an oven. The calcined CuO/SiO$_2$/Al$_2$O$_3$ powder was milled with a continuous mill with $D_{90}$<5 μm. After adjusting the slurry solid content to a level appropriate for the targeted loading (0.3 g/in$^3$ (g/(2.54 cm)$^3$)), a filter substrate (filter substrate made of silicon carbide with a porosity of about 42% of the mean pore size about 11 μm and a volume of 2.1 liter) was immersed into the slurry with the outlet side held ¼ inch (2.54 cm) above the slurry level. The substrate was pulled out of the slurry, and a stream of air was blown from the outlet side of the channels until no washcoat slurry was coming out from the inlet side. The coated sample was then dried at 110° C. for 2 hours and calcined in air at 450° C. for 1 hour.

A Pt-containing slurry was made separately. A pre-milled SiO$_2$/Al$_2$O$_3$ powder (90% of the particles are less than 5 micrometers, or $D_{90}$<5 μm) was suspended in water to reach about 40% solid. A calculated amount of platinum tetra monoethanolamine hydroxide solution was added into the suspension drop-wise while stirring. The resulting slurry was further diluted with water to achieve about 4% solids by weight.

Similarly, the Pt slurry was coated from the outlet side of the filter with 100% coverage. The coated sample was then dried at 110 C for 2 hours and calcined in air at 450 C for 1 hour. The Pt loading in the coated zone is 2 g/ft$^3$ (g/(30.48 cm)$^3$).

The sample was aged in an oven at 800° C. for 16 h with 10% water in air.

4.2 Example 4.2—Comparison of H$_2$S Suppression

The filter of Example 2.2 was compared to the filter of Example 4.1 regarding the H$_2$S suppression during active filter regeneration of soot loading filter.

The respective CSF of Examples 2.2 and 4.1 were tested downstream an LNT which was loaded with sulfur prior testing. The combined LNT+CSF samples were placed in a laboratory gas reactor setup.

For H$_2$S suppression evaluation, a desulfation procedure (DeSOx) was applied to the LNT. In this procedure, the Air to Fuel ratio (Lambda) varied between 0.95 (rich, 30 s) and 1.07 (lean, 10 s) for a total of 10 min. During the DeSOx procedure, H$_2$S (500 ppm) was emitted from the LNT and entered the respective CSF. The temperature in front of the LNT was 670° C., in front of the catalyzed soot filter 460-540° C. and the CSF space velocity was 34 K. During the DeSOx procedure, the H$_2$S is converted to SO$_2$. The H$_2$S concentration in the CSF emissions was monitored by a mass spectrometer.

The results are summarized in Table 2 below:

|  | Example 2.2 | Example 4.1 |
|---|---|---|
| CSF inlet H$_2$S (ppm) | 500 | 500 |
| CSF outlet H$_2$S (ppm) | 0 | 57 |

As can be seen from this comparative test of the filters of Examples 2.2 and 4.1, the filter of Example 4.1, despite having a high surface area of CuO in Example 4.1, this sample shows a higher H$_2$S emission than the filter of Example 2.2.

5. CuO on Inlet Side vs. CuO on Outlet Side 5.1 Examples 5.1 to 5.6—Catalyst Preparation The filters of Examples 5.1 to 5.6 were prepared in an analogous manner, with different characteristics as outlined in Table 2 below.

CuO was suspended in water to make a slurry with a solid content of 30-40%; this slurry was milled to D$_{90}$<4 μm. The slurry was then diluted to 10% solid by weight.

Separately, a Pt containing slurry was made. A pre-milled SiO$_2$/Al$_2$O$_3$ powder (90% of the particles are less than 5 micrometers, D$_{90}$<5 μm) was suspended in water to reach 40% solid. A calculated amount (see Table 2 below) of platinum tetra monoethanolamine hydroxide solution was added into the suspension drop-wise while stirring.

A filter substrate made of silicon carbide with a porosity of about 42% of the mean pore size about 11 μm and a volume of 2.1 liter was provided. The substrate was first immersed into the respective slurry (see Table 2 below) with inlet side down with the outlet side held above the slurry level to the amount as indicated below in Table 2 in order to result in the corresponding inlet coverage. The substrate was pulled out of the slurry, and a stream of air was blown from the outlet side of the channels until no washcoat slurry was coming out from the inlet side. The coated sample was then dried at 110° C. for 2 hours and calcined in air at 450° C. for 1 hour, resulting in the below indicated percentage of the inlet side of the filter.

Similarly, the other respective slurry was then coated from the outlet side of the filter. The coated sample was then dried at 110° C. for 2 hours and calcined in air at 450° C. for 1 hour, resulting in the below indicated percentage of the outlet side of the filter (see Table 2).

The samples was aged in an oven at 800° C. for 16 h with 10% water in air, resulting in a CSF having the coating characteristics as indicated in Table 2.

TABLE 2

| Sample No. | Inlet Coverage (%) | Inlet Washcoat | Outlet Coverage (%) | Outlet Washcoat |
|---|---|---|---|---|
| 5.1 | 25 | 0.25 g/in$^3$ CuO | 75 | 1.33 g/ft$^3$ Pt on 0.25 g/in$^3$ |
| 5.2 | 33 | 0.25 g/in$^3$ CuO | 67 | 1.49 g/ft$^3$ Pt on 0.25 g/in$^3$ |
| 5.3 | 50 | 0.25 g/in$^3$ CuO | 50 | 2 g/ft$^3$ Pt on 0.25 g/in$^3$ |
| 5.4 | 75 | 1.33 g/ft$^3$ Pt on 0.25 g/in$^3$ | 25 | 0.25 g/in$^3$ CuO |
| 5.5 | 67 | 1.49 g/ft$^3$ Pt on 0.25 g/in$^3$ | 33 | 0.25 g/in$^3$ CuO |
| 5.6 | 50 | 2 g/ft$^3$ Pt on 0.25 g/in$^3$ | 50 | 0.25 g/in$^3$ CuO |

5.2 Example 5.7—Comparison of Secondary CO Emission

The six filter substrates of Examples 5.1 to 5.6 were tested for CO oxidation during active filter regeneration of soot loading filter (secondary CO emission). During soot oxidation a high amount of CO is produced which needs to be oxidized to CO$_2$ over the filter substrate by the oxidation catalyst.

Prior testing, the samples were loaded with 11 g/l soot in the exhaust stream of a 4 cylinder light duty diesel engine with 2 L engine displacement.

For active regeneration testing each of the three samples was placed downstream a standard diesel oxidation catalyst (DOC) in the exhaust line of a 4 cylinder light duty diesel engine with 2 L displacement. The temperature in front of the catalyzed soot filter was risen to 620° C. for 10 min. The CO concentration is monitored. The generated amount from soot burning is represented by the CO emissions of the uncoated filter substrate.

Figure 7:
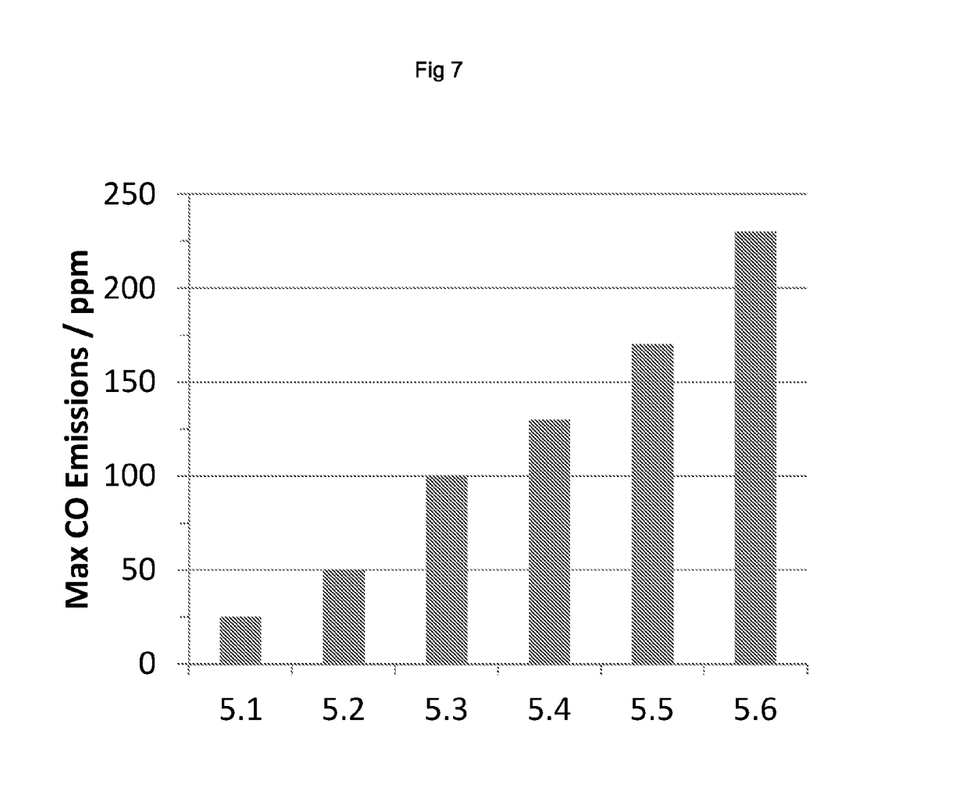

As can be seen from FIG. 7, the secondary CO emission during active filter regeneration is reduced in the filter of Example 5.1, compared to the filter of Example 5.4 with the inverted coating regarding inlet and outlet side. The same may also be concluded from the comparison of the filters of Examples 5.2 and 5.5, and 5.3 and 5.6, respectively.

The invention claimed is:

1. A catalyzed soot filter, comprising
    a wall flow substrate comprising an inlet end, an outlet end, a substrate axial length extending between the inlet end and the outlet end, and a plurality of passages defined by internal walls of the wall flow filter substrate;
    wherein the plurality of passages comprise inlet passages having an open inlet end and a closed outlet end, and outlet passages having a closed inlet end and an open outlet end;
    wherein the internal walls of the inlet passages comprise an inlet coating comprising at least one layer, and the inlet coating extends from the inlet end to an inlet coating end, thereby defining an inlet coating length, wherein the inlet coating length is x % of the substrate axial length, wherein x is from 25 to 100; and wherein the internal walls of the outlet passages comprise an outlet coating comprising at least one layer, and the outlet coating extends from the outlet end to an outlet coating end, thereby defining an outlet coating length, wherein the outlet coating length is y % of the substrate axial length, wherein y is from 25 to 100;

wherein the inlet coating length defines an upstream zone of the catalyzed soot filter and the outlet coating length defines a downstream zone of the catalyzed soot filter;

wherein the wall flow substrate comprises at least one layer comprising at least one oxidation catalyst and at least one layer comprising at least one $H_2S$ suppressing material, wherein the $H_2S$ suppressing material comprises CuO in the tenorite phase;

wherein the at least one oxidation catalyst and the at least one $H_2S$ suppressing material are separated by the internal walls of the wall flow filter substrate;

the total coating length is x+y, and x+y is greater than or equal to 150 and wherein the inlet coating comprises the $H_2S$ suppressing material, and the outlet coating comprises the at least one oxidation catalyst.

2. The catalyzed soot filter of claim 1, wherein x+y is greater than 175.

3. The catalyzed soot filter of claim 1, wherein x is from 50 to 100.

4. The catalyzed soot filter of claim 1, wherein y is from 50 to 100.

5. The catalyzed soot filter of claim 1, wherein the $H_2S$ suppressing material is supported on a support material not containing alumina ($Al_2O_3$).

6. The catalyzed soot filter of claim 1, wherein the $H_2S$ suppressing material further comprises a metal selected from the group consisting of Mn, Fe, Ni and mixtures thereof.

7. The catalyzed soot filter of claim 1, wherein an average crystallite size of the CuO is at least 30 nm.

8. The catalyzed soot filter of claim 1, wherein a BET surface area of the CuO in the tenorite phase is less than 5 $m^2/g$.

9. The catalyzed soot filter of claim 1, wherein the wall flow substrate is a porous wall flow substrate, and the at least one oxidation catalyst and/or the at least one $H_2S$ suppressing material have been introduced into the porous walls of the porous wall flow substrate.

10. The catalyzed soot filter of claim 1, wherein in the coating containing the at least one oxidation catalyst, the oxidation catalyst comprises:
(a) Pt, but no Pd; or
(b) Pd, but no Pt; or
(c) Pt and Pd, provided that the weight ratio of Pt:Pd is in the range of from 20:1 to 1:1.

11. A system for treating a diesel engine exhaust stream, the system comprising an exhaust conduit in fluid communication with the diesel engine via an exhaust manifold; the catalyzed soot filter of claim 1; and one or more of the following in fluid communication with the catalyzed soot filter: a diesel oxidation catalyst (DOC), a selective catalytic reduction (SCR) article, a NOx storage and reduction (NSR) catalytic article, a lean NOx trap (LINT) article.

12. A method of treating a diesel engine exhaust stream, the exhaust stream containing soot particles, said method comprising contacting the exhaust stream with the catalyzed soot filter of claim 1.

13. The method of treating a diesel engine exhaust stream according to claim 12, wherein the catalyzed soot filter is arranged downstream of an article that produces $H_2S$.

14. The method of treating a diesel engine exhaust stream of claim 12, wherein an average crystallite size of the CuO in the tenorite phase is at least 30 nm.

15. The catalyzed soot filter of claim 1, wherein the $H_2S$ suppressing material is not supported on a support material.

16. The system of claim 11, wherein the catalyzed soot filter is arranged downstream of an article that produces $H_2S$.

17. A process for manufacturing a catalyzed soot filter comprising:
(i) providing a wall flow substrate comprising an inlet end, and outlet end, a substrate axial length extending between the inlet end and the outlet end, and a plurality of passages defined by the internal walls of the wall flow substrate;
wherein the plurality of passages comprise inlet passages having an open inlet end and a closed outlet end, and outlet passages having a closed inlet end and an open outlet end;
wherein a given inlet passage, an adjacent outlet passage, and the internal wall between said inlet and said outlet passage define an overall passage;
(ii) applying a first coating to at least part of the internal walls of at least 25% of the overall passages such that the first coating extends from the inlet end to a first coating end whereby an inlet coating length is defined, wherein the inlet coating length is x % of the substrate axial length, with 25≤x≤100, said first coating comprising at least one oxidation catalyst or at least one $H_2S$ suppressing material;
(iii) applying a second coating to at least part of the internal walls of at least 25% of the overall passages such that the second coating extends from the outlet end to a second coating end whereby an outlet coating length is defined, wherein the outlet coating length is y % of the substrate axial length, with 25≤y≤100, said second coating comprising at least one oxidation catalyst or at least one $H_2S$ suppressing material;
wherein the outlet coating comprises the at least one oxidation catalyst, and the inlet coating comprises the at least one $H_2S$ suppressing material, and the at least one oxidation catalyst and the at least one $H_2S$ suppressing material are separated by the internal walls of the wall flow filter substrate, and the total coating length is x+y, and x+y is greater than or equal to 150, and
wherein the $H_2S$ suppressing material comprises CuO in the tenorite phase.

18. The process for manufacturing a catalyzed soot filter of claim 17, wherein the wall flow substrate has a porosity in the range of from 38 to 75, determined according to mercury porosimetry measurement according to DIN 66133 and wherein the wall flow substrate is a cordierite substrate, an aluminum titanate substrate, or a silicon carbide substrate.

* * * * *

UNITED STATES PATENT AND TRADEMARK OFFICE
CERTIFICATE OF CORRECTION

PATENT NO. : 10,369,548 B2
APPLICATION NO. : 15/124146
DATED : August 6, 2019
INVENTOR(S) : Gerd Grubert et al.

It is certified that error appears in the above-identified patent and that said Letters Patent is hereby corrected as shown below:

On the Title Page

Item (72), Inventors, Lines 1-2, delete "Alfred H. Punke" and insert -- Alfred Punke --, therefor.

In the Specification

In Column 7, Line 44, delete "prasedodymium," and insert -- praseodymium, --, therefor.

In Column 8, Line 37, delete "H$_2$5" and insert -- H$_2$S --, therefor.

In Column 9, Line 58, after "the" delete "a".

In Column 11, Line 53, delete "25=x≤100," and insert -- 25≤x≤100, --, therefor.

In Column 13, Line 9, delete "O2" and insert -- O$_2$ --, therefor.

In Column 13, Line 59, delete "H2S" and insert -- H$_2$S --, therefor.

In Column 14, Line 2, delete "Al$_2$O$_3$powder" and insert -- Al$_2$O$_3$ powder --, therefor.

In Column 15, Line 11, delete "Al$_2$O$_3$powder" and insert -- Al$_2$O$_3$ powder --, therefor.

In Column 15, Line 49, delete "Al$_2$O$_3$powder" and insert -- Al$_2$O$_3$ powder --, therefor.

In Column 16, Line 7, delete "SiO2" and insert -- SiO$_2$ --, therefor.

In Column 16, Line 35, delete "H2S" and insert -- H$_2$S --, therefor.

In Column 16, Line 53, delete "Al$_2$O$_3$powder" and insert -- Al$_2$O$_3$ powder --, therefor.

Signed and Sealed this
Seventeenth Day of March, 2020

Andrei Iancu
*Director of the United States Patent and Trademark Office*

CERTIFICATE OF CORRECTION (continued)
U.S. Pat. No. 10,369,548 B2

In Column 17, Line 60, delete "11 g/I" and insert -- 11 g/l --, therefor.

In Column 18, Line 61, delete "$Al_2O_3$powder" and insert -- $Al_2O_3$ powder --, therefor.

In Column 19, Line 50, delete "$Al_2O_3$powder" and insert -- $Al_2O_3$ powder --, therefor.

In the Claims

In Column 21, Line 62, Claim 11, delete "(LINT)" and insert -- (LNT) --, therefor.